3,336,268
BRIDGED POLYPROPYLENE
William W. Cox, Wilmington, Del., assignor to Hercules Incorporated, a corporation of Delaware
Filed Oct. 14, 1963, Ser. No. 316,002
10 Claims. (Cl. 260—79.3)

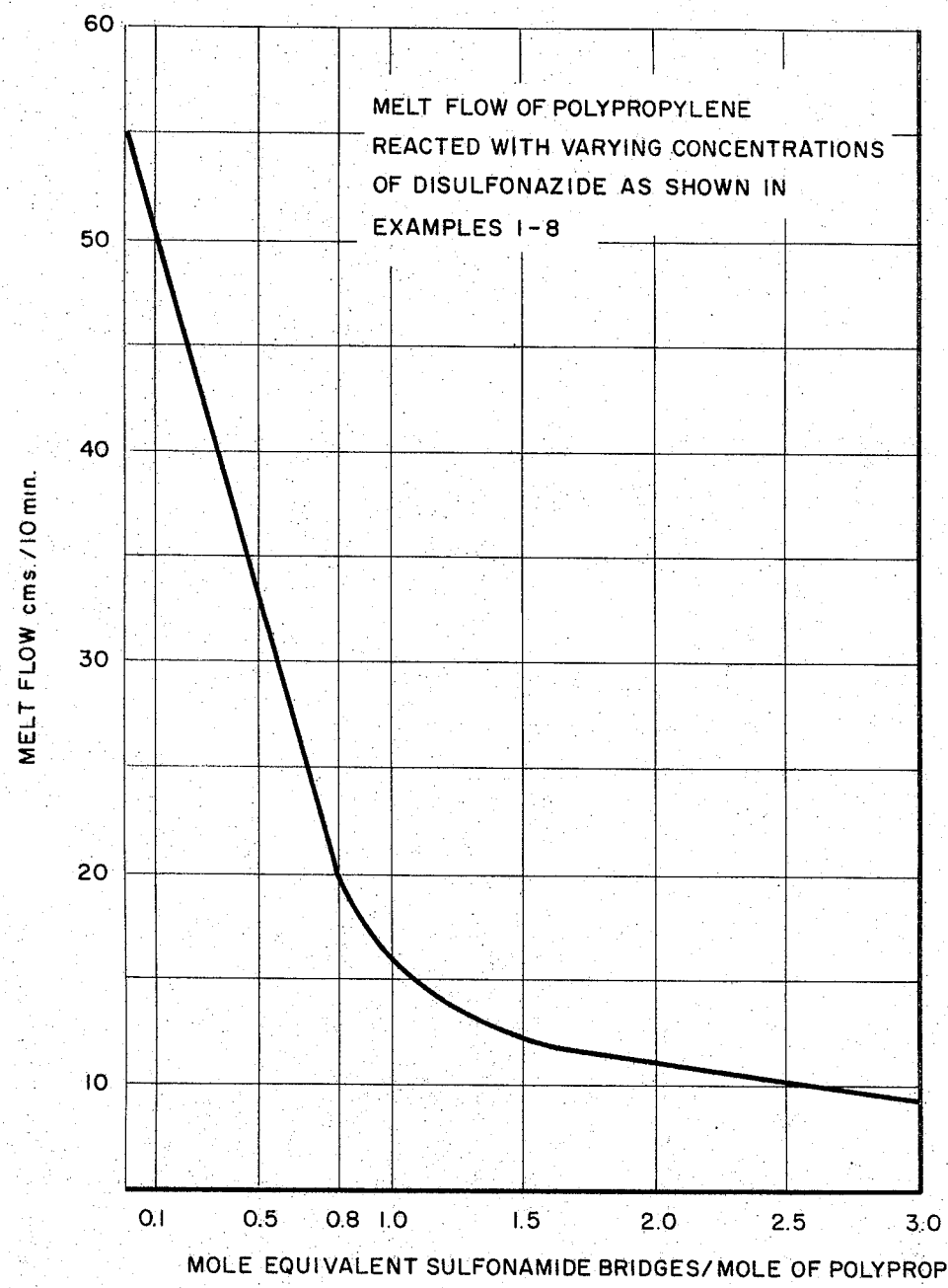

This invention relates to bridged polypropylene and bridged polypropylene-elastomer alloys of improved properties. More specifically, this invention relates to polypropylene and polypropylene-elastomer alloys bridge with sulfonamide groups.

Recent advances in the art of polymerization have enabled the preparation of propylene polymers including alloys with other polymers valuable for a variety of uses. These propylene polymers in the raw state are deficient in certain properties such as hardness, stiffness, impact strength, gas permeability, solvent permeability, low temperature toughness, etc. It is known in the art to cross-link these polymers in order to change their properties. Such cross-linked polymers are compression moldable and extremely useful in applications where resistance to solvents and elevated temperatures are important. However, they are insoluble after cross-linking and can no longer be considered thermoplastics, capable of being extruded, injection molded, or processed by other methods requiring melt flow. It has now been discovered that polypylene polymers bridge with sulfonamide groups can be prepared which are completely soluble in the usual polypropylene solvents but have greater hardness, strength and stiffness, higher density and lower permeability to gases and liquids. These bridged polymers extrude smoothly with reduced sag and can be thermoformed into a variety of useful articles.

Accordingly, this invention relates to a solid, thermoplastic propylene polymer containing from about 0.1 to about 0.8 mole equivalent per mole of polypropylene of sulfonamide bridges having the structure

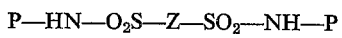

P—HN—O$_2$S—Z—SO$_2$—NH—P where P is polypropylene and Z is an organic radical free of hindering groups. The expression "free of hindering groups" means that Z does not contain a group which will interfere with the bridging reaction. For example, Z may contain one or more free sulfonazide groups, which are not hindering groups. The bridged propylene polymer of this invention is completely soluble in perchlorethylene at a temperature of 110° C. and can be extruded smoothly and thermoformed at temperatures only slightly higher than the unbridged polymer. The unique bridged propylene polymers of this invention begin to crystallize at a higher temperature and crystallization is complete in one-tenth the time required to crystallize unbridged polypropylene. The resulting crystallized bridged polymer contains a considerably larger number of spherulites of less than one-tenth the size of those found in unbridged polypropylene and exhibits an improved clarity.

Any stereoregular propylene ploymer including alloys of stereoregular polypropylene with from about 1% to about 25% of an elastomeric hydrocarbon polymer, containing not more than about 5% by weight of unsaturation, can be used in the preparation of the bridged propylene polymers of this invention. Exemplary elastomeric hydrocarbon polymers which can be alloyed with the polypropylene are polyisobutylene, butyl rubber, ethylene-propylene copolymers, ethylene-propylene-dicyclopentadiene terpolymers, etc.

Any polysulfonazide, i.e., any compound having the general formula R(SO$_2$N$_3$)$_x$ where R is an organic radical inert to bridging reactions and $x$ is from about 2 to about 8 can be used. Most preferably $x$ will average about 2 and R will be selected from the group of organic radicals consisting of alkylene, halogenated alkylene, arylene, aralkylene and alkarylene radicals. Exemplary polysulfonazides are the alkyl sulfonazides such as 1,5-pentane bis(sulfonazide), 1,8-octane bis(sulfonazide), 1,10-decane bis(sulfonazide), 1,10-octadecane bis(sulfonazide), etc., the aryl bis(sulfonazides) such as 1,3-benzene bis(sulfonazide), 4,4'-diphenyl methane bis(sulfonazide), 1-octyl-2,4,6-benzene tris(sulfonazide), 4,4'-diphenyl ether bis(sulfonazide), 1,6-bis(4'-sulfonazidophenyl)hexane, 2, 7-naphthalene bis(sulfonazide), etc., and mixed sulfonazides of chlorinated aliphatc hydrocarbons containing an average of from about 1 to 8 chlorine atoms and from about 2 to 5 sulfonazide groups per molecule.

The bridging reaction is carried out by heating the propylene polymer in the presence of the polysulfonazide to a temperature at which the sulfonazide decomposes, i.e., generally in the range of from about 100° C. to about 250° C. The amount of polysulfonazide used will be sufficient to yield a polymer containing from about 0.1 to about 0.8 mole equivalents per mole of polypropylene of sulfonamide bridges. The criticality of the amount of polysulfonazide used is shown in the attached drawing. In the drawing, the mole equivalents per mole of polypropylene is plotted against melt flow. It can clearly be seen from this drawing that at concentrations above the range employed in the invention, abrupt changes occur in the rheological properties of the polymer. It should also be pointed out that at the break point of the curve (between about 0.8 and 1.0) the polymers change from complete solubility in perchlorethylene (at 110° C.) to insolubility.

The polysulfonazide bridging agent can be incorporated in the propylene polymer by a number of methods. For example, it can be uniformly blended by simply milling on a conventional rubber mill or dissolved in a solution or dispersion containing the polymer. By any of these methods, the bridging agent is distributed throughout the polymer and uniform bridging is effected when the mixture is heated.

The bridged propylene polymers of this invention can contain additives, as, for example, extenders, fillers, pigments, stabilizers, flame retardants, etc. However, there are many cases in which a bridged propylene polymer containing an additive is not required or desired and excellent products are obtained which have nothing added to them except the bridging agent.

The following examples are presented to illustrate the unique bridged propylene polymers of this invention. All parts and percentages are by weight unless otherwise indicated. Molecular weight wherever shown in this application was determined by Reduced Specific Viscosity. By the term "Reduced Specific Viscosity" is meant the $\eta$ sp./c. determined on an 0.1% solution of the polymer in decahydronaphthalene at a temperature of 135° C.

*Examples 1–8*

These examples illustrate the effect of varying the amount of polysulfonazide on certain properties of polypropylene. In each example, a mixed sulfonazide of a chlorinated alkyl hydrocarbon containing on an average 11 carbon atoms, 2 chlorine atoms and 2 sulfonazide groups per molecule was used as the bridging agent.

In each example, 100 parts of a finely divided polypropylene, having a molecular weight of approximately 400,000, was wet with acetone containing the desired amount of the disulfonazide and 0.25 part of 4,4'-thiobis (3-methyl,6-tertbutylphenol) stabilizer. The acetone was evaporated with stirring and the resulting powder dried under vacuum at a temperature of 60° C. Each powdered mixture was placed on a 2-roll mill and milled for 12 minutes at a temperature of 171° C. The resulting milled sheets were each chopped into small particles and then extruded through a ¾" diameter extruder at a temperature of 225° C. The resulting extrudates were examined for smoothness and then tested to determine their melt flow and solubility in perchlorethylene. The moles of disulfonazide per mole of polymer, the smoothness of the extrudates, their melt flow and solubility in perchlorethylene are tabulated in Table I.

TABLE I

| Ex. No. | Moles of Disulfonazide/Mole of Polypropylene | Melt Flow* at 230° C., 10 kg. load | Extrudate Surface | Solubility in Perchlorethylene at 110° C. |
|---|---|---|---|---|
| 1 | 0 | 56.0 | Smooth | Soluble. |
| 2 | 0.25 | 45.1 | ---do--- | Do. |
| 3 | 0.50 | 33.8 | ---do--- | Do. |
| 4 | 0.75 | 22.1 | ---do--- | Do. |
| 5 | 1.00 | 15.7 | Rough | Insoluble. |
| 6 | 1.50 | 12.5 | ---do--- | Do. |
| 7 | 2.00 | 10.9 | Very rough | Do. |
| 8 | 3.00 | 9.1 | ---do--- | Do. |

*ASTM D1238-57T.

In order to more graphically show the effect of various amounts of disulfonazide on the melt flow of polypropylene, the melt flow has been plotted as a function of concentration, using the figures of Table I, in the accompanying drawing. It will be noted from the drawing that there is a break point in the curve as the concentration of disulfonazide increases above 0.8 mole of disulfonazide per mole of polypropylene. This break point or inflection in the curve indicates a change from viscous flow to elastic flow caused by a change in the molecular structure of the composition. Conclusive evidence of this change in structure is shown by the insolubility in perchlorethylene and rough extrusions of compositions containing 1.0 or more mole of disulfonazide per mole of polypropylene.

*Examples 9–24*

These examples illustrate the effect of treating various samples of polypropylene with different polysulfonazides at concentrations within the range of this invention (even numbered examples) and at concentrations above the range of this invention. In each sample, the polysulfonazide was incorporated in the polypropylene and the resulting mixture milled and extruded as described in Examples 1–8. The extrudates were examined for smoothness and tested for solubility in perchlorethylene at 110° C. The specific polypropylene used, the specific polysufonazides used, and the moles of polysulfonazide per mole of polymer are tabulated in Table II.

TABLE II

| Ex. No. | Polypropylene, Molecular Wt. | Polysulfonazide | Moles of Polysulfonazide/Mole of Polymer |
|---|---|---|---|
| 9 | 400,000 | 1,10-decane bis(sulfonazide) | 1.14 |
| 10 | 400,000 | ---do--- | 0.57 |
| 11 | 400,000 | 1,10-octadecane bis(sulfonazide) | 0.87 |
| 12 | 400,000 | ---do--- | 0.44 |
| 13 | 590,000 | Mixed sulfonazide* | 1.47 |
| 14 | 590,000 | ---do--- | 0.74 |
| 15 | 690,000 | ---do--- | 1.72 |
| 16 | 690,000 | ---do--- | 0.51 |
| 17 | 350,000 | ---do--- | 0.89 |
| 18 | 350,000 | ---do--- | 0.45 |
| 19 | 300,000 | 1,8-octane bis(sulfonazide) | 0.94 |
| 20 | 300,000 | ---do--- | 0.47 |
| 21 | 450,000 | 1,10-decane bis(sulfonazide) | 1.29 |
| 22 | 450,000 | ---do--- | 0.65 |
| 23 | 275,000 | 1,3-benzene bis(sulfonazide) | 0.97 |
| 24 | 275,000 | ---do--- | 0.47 |

*As described in Examples 1-8.

In each example where the polypropylene was treated with an amount of polysulfonazide within the range of this invention (even numbered examples), the extrudate was smooth and completely soluble in perchlorethylene at 110° C., while in each example where an amount above the range of this invention was used (odd numbered examples), the extrudates were rough to very rough and incompletely soluble in perchlorethylene at 110° C.

*Example 25*

A sample of polypropylene having a molecular weight of 400,000 was wet with acetone containing 1,10-decane bis(sulfonazide) in an amount of 0.03 part of disulfonazide per 100 parts polypropylene according to the procedure of Examples 1–8. The acetone was then evaporated, the resulting powder milled and extruded as described in Examples 1–8. The extruded polymer was chopped into pellets and injection molded into sample bars and dumbbells using a small injection molding machine at a temperature of 220° C. and 800 p.s.i. pressure on the ram. A sample of the polypropylene was treated in exactly the same way except the disulfonazide was omitted. The sample bars and dumbbells of bridged and unbridged polypropylene were tested to determine their various physical properties. The results of these tests are tabulated below.

| | Bridged Polypropylene | Unbridged Polypropylene |
|---|---|---|
| Density | 0.914 | 0.905 |
| Hardness (Rockwell R) | 104 | 95 |
| Tensile Strength (p.s.i.) | 6,500 | 5,700 |
| Tensile Modulus (p.s.i.) | 250,000 | 210,000 |
| Izod Notched Impact Strength (ft. pounds/inch notch) 23° C | 0.86 | 0.62 |

*Example 26*

A sample of polypropylene having a molecular weight of 350,000 was wet with acetone containing the mixed sulfonazide described in Examples 1–8 in an amount sufficient to yield a composition containing 0.25 mole of the sulfonazide per mole of polypropylene. This mixture was worked up exactly as described in Examples 1–8 and then extruded as a film 0.0012" thick. A sample of the polypropylene was treated in exactly the same way except for the addition of the sulfonazide and the two films tested to determine their oxygen permeability. The film of bridged polypropylene was found to have an oxygen permeability of 196 cc./100 sq. in./24 hours/atmosphere/mil at room temperature, as compared with a permeability of 248 cc./100 sq. in./24 hours/atmosphere/mil at room temperature for the unbridged polypropylene.

*Example 27*

A sample of polypropylene having a molecular weight of 400,000 was wet with acetone containing 1,10-decane bis-(sulfonazide) in an amount sufficient to yield a composition containing 0.03 part of disulfonazide per 100 parts of polypropylene according to the procedure of Examples 1–8. The composition was worked up exactly as described in Examples 1–8, extruded and chopped into pellets. The resulting pellets were extruded as parisons in a 1¼" diameter extruder at a temperature of 200° C. and the resulting parisons blown into standard Boston round-type 4 oz. bottle molds. A sample of polypropylene was treated in exactly the same way except for the addition of disulfonazide. Five bottles each of the bridged polypropylene and unbridged polypropylene were filled with 120 grams of n-heptane, stoppered and maintained at room temperature. The bottles were observed for weight loss after 3, 4, and 5 days. The average weight loss observed is tabulated below.

| Days | Grams n-heptane lost | |
|---|---|---|
| | Bridged Polypropylene | Unbridged Polypropylene |
| 3 | 11.9 | 22.9 |
| 4 | 17.9 | 33.4 |
| 5 | 23.8 | 43.2 |

*Example 28*

This example illustrates the effect of a disulfonazide on the crystallization of polypropylene. A specimen of the bridged polypropylene described in Example 10 and an unbridged control were melted simultaneously at a temperature of 225° C. After 5 minutes, both specimens were rapidly transferred to a silicone oil bath, maintained at a temperature of 118° C., and their crystallization behavior observed microscopically. Initiation of crystallization of the bridged polymer occurred in approximately 16 seconds and was completed in 60 seconds. The resulting composition had a density of 0.912 and contained an extremely large number of spherulites whose diameters were predominantly less than 20 microns. Initiation of the crystallization of the unbridged polypropylene occurred in approximately 50 seconds and was completed in 10 minutes. The resulting composition had a density of 0.905 and contained relatively fewer spherulites, all of which had diameters predominantly greater than 200 microns.

*Example 29*

Specimens of the bridged polypropylene of Example 22 and a control of unbridged polypropylene were tested by differential thermal analysis (for a description of this test see Bacon Ke, Journal of Polymer Science, vol. 61, 47–59, 1962) to compare their behavior on cooling at a rate of 6.5° C. per minute from a temperature of 200° C. This analysis showed that initiation of crystallization of the bridged polypropylene occurred at 135° C., reached a maximum rate at 128° C. and an area under the peak exotherm of 0.09 sq. inch. The analysis of the unbridged polypropylene showed an initiation of crystallization at 125° C., a maximum rate of crystallization at 118° C. and an area under the peak exotherm of 0.19 sq. inch.

*Example 30*

This example illustrates the effect of a polysulfonazide on the properties of a polypropylene-polyisobutylene alloy.

A sample comprising 90 parts of a finely divided polypropylene, having a molecular weight of approximately 425,000, was wet with acetone containing 0.25 part of 4,4'-thiobis(3-methyl,6-tert-butylphenol) stabilizer. The acetone was evaporated with stirring and the resulting powder dried under vacuum at a temperature of 60° C. The powdered mixture was placed on a 2-roll mill and compounded with 10 parts of polyisobutylene, having a molecular weight of approximately 90,000, for 15 minutes at a temperature of 170° C. Then 0.5 mole per mole of polypropylene of the mixed sulfonazide described in Examples 1–8 was added and compounded on the mill for an additional 5 minutes at a temperature of 170° C. A control sample was prepared exactly the same way except for the omission of the sulfonazide. The resulting milled sheets were each chopped into small particles and then extruded at a temperature of 225° C. to complete the reaction of the sulfonazide. The extrudates were then compression molded at 215° C. for 15 minutes into 6" x 6" x 0.04" test sheets. The resulting sheets were tested for tensile impact strength, melt flow and solubility in perchlorethylene. The results of these tests are tabulated below.

| | Control | Bridged |
|---|---|---|
| Tensile Impact Strength at −10° C. (ft. pounds/sq. inch) | 13 | 24 |
| Melt Flow* at 230° C., 10 kg. load | 6.7 | 3.3 |
| Solubility in Perchlorethylene at 110° C | Sol. | Sol. |

*ASTM D1238-57T.

*Examples 31–34*

These examples illustrate the reduction of sagging of hot polypropylene extrudates effected by different amounts of polysulfonazide. In each example, the sulfonazide and 4,4'-thiobis(3-methyl-6-tert-butylphenol) stabilizer was incorporated in the polypropylene and the resulting mixture milled and extruded exactly as described in Examples 1–8. When strands of exactly 9.25 inches in length had emerged from the extruder die, they were grasped by steel forceps with 0.25 inch blades at the face of the die and suspended vertically until cool. The percent of sag was calculated from the final length of the cool strand compared with the 9 inch strand as extruded. The polypropylene used in these examples had a molecular weight of approximately 400,000 and the sulfonazide used was the mixed sulfonazide described in Examples 1–8. The moles of sulfonazide per mole of polymer and the percent sag are tabulated below.

| Example No. | Moles of Sulfonazide/Mole of Polymer | Percent Sag |
|---|---|---|
| 31 | 0 | *90 |
| 32 | 0.25 | 35 |
| 33 | 0.50 | 25 |
| 34 | 0.75 | 11 |

*The unbridged sample sagged nearly double and then ruptured under its own weight.

*Examples 35 and 36*

These examples illustrate the effect of polysulfonazide on the properties of polypropylene - polyisobutylene alloys. In Example 36, the polysulfonazide was incorporated in the polypropylene, the polyisobutylene added and the resulting mixture milled and extruded as described in Example 30. In Example 35, the polysulfonazide was omitted. The polypropylene used had a molecular weight of approximately 400,000 and the polyisobutylene a molecular weight of approximately 90,000. The polysulfonazide employed was the mixed sulfonazide described in Examples 1–8. The composition of the alloys, the moles of sulfonazide per mole of polypropylene and the resulting properties are tabulated in Table III.

TABLE III

| | Example No. | |
|---|---|---|
| | 35 | 36 |
| Polypropylene | 85 | 85 |
| Polyisobutylene | 15 | 15 |
| Moles Sulfonazide/mole of polypropylene | | 0.2 |
| Melt flow (at 230 °C., 2 kg. load) | 1.40 | 1.07 |
| Bell brittleness, ° C.* | −5 | −9 |
| Izod notched impact strength (ft. pounds/inch notch): | | |
| −10° C | 0.40 | 0.54 |
| 23° C | 1.43 | 1.87 |
| Tensile strength, p.s.i. | 4,970 | 5,225 |

*ASTM D746-57T.

As seen from the above table, bridging with a polysulfonazide improves toughness at both low temperature and room temperature as well as strength.

*Examples 37 and 38*

These examples illustrate the effect of a polysulfonazide on the properties of an alloy of polypropylene (approximate molecular weight 400,000) and an ethylene-propylene-dicyclopentadiene terpolymer having a molecular weight of approximately 240,000 and the following composition:

| | Percent |
|---|---|
| Ethylene | 64.8 |
| Propylene | 30.0 |
| Dicyclopentadiene | 5.2 |

In Example 37, the polysulfonazide was incorporated in the polypropylene, the terpolymer added and the resulting mixture milled and extruded as described in Example 30. In Example 38, the polysulfonazide was omitted. The polysulfonazide employed was the mixed sulfonazide described in Examples 1–8. The composition of the alloys, the moles of polysulfonazide per mole of polypropylene and the resulting properties are tabulated below:

| | Ex. 37 | Ex. 38 |
|---|---|---|
| Polypropylene, parts per hundred | 87.5 | 87.5 |
| Terpolymer, parts per hundred | 12.5 | 12.5 |
| Moles of sulfonazide per mole polypropylene | 0.25 | |
| Rockwell hardness (R scale) | 82 | 77 |
| Tensile strength, p.s.i | 5,886 | 5,370 |
| Tensile modulus, p.s.i | 237,000 | 217,000 |
| Density | 0.8962 | 0.8845 |
| Melt flow (at 230° C., 2 kg. load) | 1.33 | 1.40 |

*Example 39*

A sample of polypropylene having a molecular weight of approximately 400,000 was wet with acetone containing 1,10-decane bis(sulfonazide) in an amount sufficient to yield a composition containing 0.03 part of disulfonazide per 100 parts of polypropylene following the procedure of Examples 1–8. The composition was worked up exactly as described in Examples 1–8, extruded and chopped into pellets. The pellets were compression molded at a temperature of 215° C. for 12 minutes (7 minute preheat) under 800 p.s.i. pressure into a sheet 0.02 inch thick. The resulting sheet was compared with a control sheet prepared exactly the same way except for the omission of the disulfonazide. Each sheet was held 1½ inches above a page from the white section of a telephone book. The printing was quite clear and could be easily read through the bridged sheet, while it could not be read through the unbridged sheet.

What I claim and desire to protect by Letters Patent is:

1. A solid thermoplastic propylene polymer, soluble in perchlorethylene at a temperature of 110° C., containing sulfonamide bridges having the structure

P—HN—O$_2$S—Z—SO$_2$—NH—P where P is polypropylene and Z is an organic radical free of hindering groups, said polypropylene, before bridging having a molecular weight of at least about 275,000 and said sulfonamide bridges comprising from about 0.02% to about 0.08% by weight of the bridged polymer.

2. The composition of claim 1 wherein the propylene polymer is stereoregular polypropylene.

3. The composition of claim 1 wherein the propylene polymer is an alloy of stereoregular polypropylene with from about 1% to 25% by weight of an elastomeric hydrocarbon polymer containing not more than about 5% by weight of unsaturation.

4. The composition of claim 3 wherein the elastomeric hydrocarbon polymer is polyisobutylene.

5. The composition of claim 3 wherein the elastomeric hydrocarbon polymer is an ethylene-propylene-dicyclopentadiene terpolymer.

6. The process of preparing shaped polymer articles which are soluble in perchlorethylene at a temperature of 110° C. which comprises heating a mixture of a propylene polymer having a molecular weight of at least about 275,000 and from about 0.02% to about 0.08% by weight of a sulfonazide having the general formula R(SO$_2$N$_3$)$_x$ wherein R is an organic radical inert to bridging reactions and $x$ is an integer from about 2 to about 8.

7. The process of claim 6 wherein the mixture is extruded.

8. The process of claim 6 wherein the mixture is extruded and then thermoformed.

9. The process of claim 6 wherein the mixture is injection molded.

10. A film of a solid thermoplastic propylene polymer, soluble in perchlorethylene at a temperature of 110° C., containing sulfonamide bridges having the structure

P—HN—O$_2$S—Z—SO$_2$—NH—P where P is polypropylene and Z is an organic radical free of hindering groups, said polypropylene, before bridging, having a molecular weight of at least about 275,000 and said sulfonamide bridges comprising from about 0.2% to about 0.08% by weight of the bridged polymer.

References Cited

UNITED STATES PATENTS 3,058,944  10/1962  Breslow et al. _____ 260—79.3 X

OTHER REFERENCES

J. K. Stille, Polymer Chemistry, 1962, p. 154 relied on.

JOSEPH L. SCHOFER, *Primary Examiner.*

D. K. DENENBERG, *Assistant Examiner.*